May 15, 1962
P. C. SQUIRES
3,034,806
DIGIT DISPLAYS
Filed Nov. 19, 1958
2 Sheets-Sheet 1
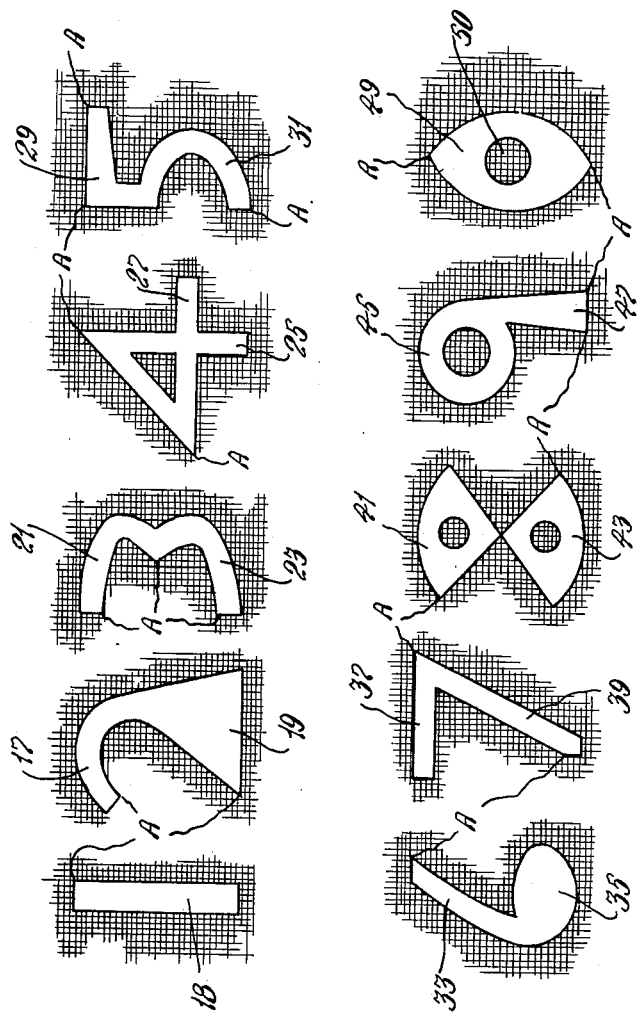
INVENTOR.
PAUL C. SQUIRES
BY
Louis B. Applebaum
ATTORNEY May 15, 1962
P. C. SQUIRES
3,034,806
DIGIT DISPLAYS
Filed Nov. 19, 1958
2 Sheets-Sheet 2
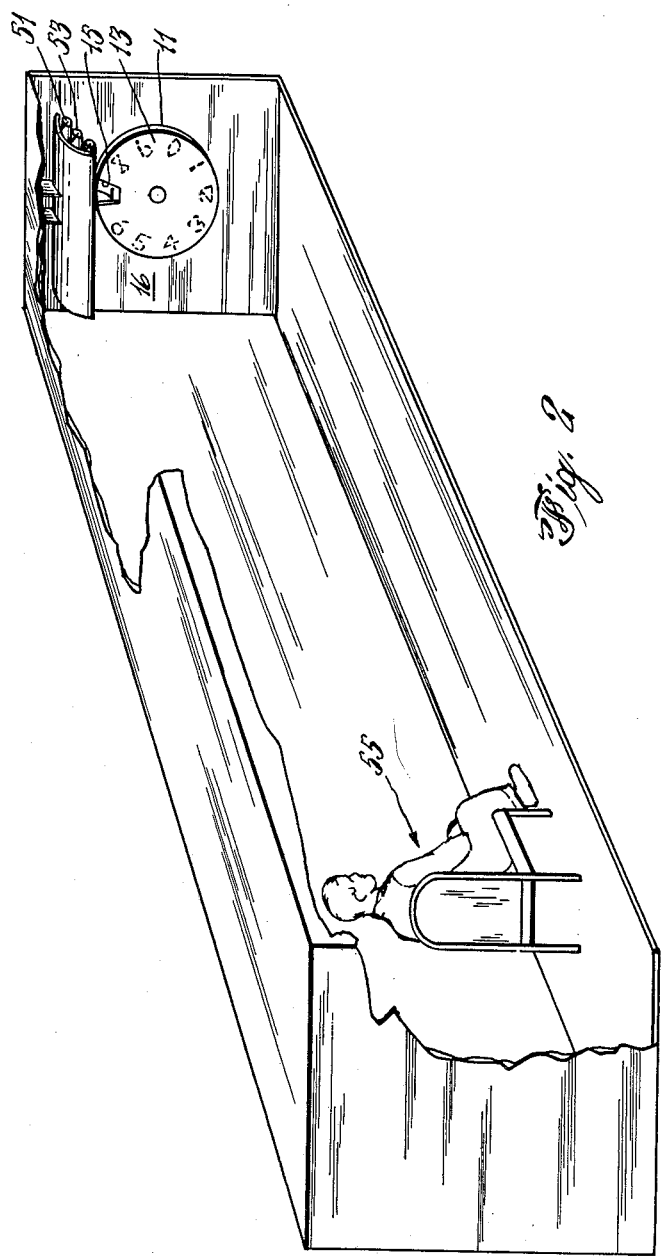
INVENTOR.
PAUL C. SQUIRES
BY
*Louis B. Applebaum*
ATTORNEY

United States Patent Office 3,034,806
Patented May 15, 1962

3,034,806
DIGIT DISPLAYS
Paul C. Squires, New London, Conn., assignor to the United States of America as represented by the Secretary of the Navy
Filed Nov. 19, 1958, Ser. No. 775,087
2 Claims. (Cl. 283—1)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in digit displays, and more particularly pertains to improvements in digit displays for environments of reflected red light of low brightness.

The visual world under red illumination of low brightness is a domain wherein perceptual anchorage is weak, contours and shapes fluctuate, float and dissipate in a nebulous manner, and wherein structure is typically loose. Consequently, the psychology of the red lighted field at low brightness is unique; the laws of visual perception, derived historically from the phenomena of daylight seeing, must be applied cautiously and with many reservations.

In certain operational environments, such as the periscope area in submarines, digit displays on instrument dials should have superior readability under operating conditions that impose low brightness levels of reflected red light. Such digit displays should be efficient when presented on an indicator, such as a rotating or non-rotating dial, under the difficult seeing conditions entailed by low red brightness. These results are accomplished in a novel manner by unique application of the literature of Gestalt psychology on figure-ground, the consequent digit display providing an approach to optimum clarity and legibility under reflected red light of low brightness on indicators, such as dials. Such results have, as a contributing factor, the minimization of confusion between a first digit display and a second digit display of a digit display family that comprises the numerals 1, 2, 3, 4, 5, 6, 7, 8, 9 and 0.

The object of this invention, accordingly, is to provide improvements in digit displays.

Other objects and many of the attendant advantages of this invention will be readily appreciated as the same becomes better understood by reference to the following detailed description when considered in connection with the accompanying drawings, wherein:

FIG. 1 is a digit display family comprising the numerals 1, 2, 3, 4, 5, 6, 7, 8, 9 and 0, showing a preferred embodiment of the invention; and FIG. 2 is a schematic showing of a digit display on a rotatable test dial, and a mask for such dial, in an environment of reflected red light of low brightness.

Apparatus probative of the novelty and usefulness of the invention is shown in FIG. 2. Each digit display is an opaque white planar member having a reflectance of approximately 80 percent under the condition of a black background. Each such display is depicted on a clear Plexiglas dial 11. The dial is mounted vertically rotatable, and is positioned immediately behind a matte black disc 13 having an open sector 15 large enough to permit one digit display to be shown at a time. Disc 13 is also rotatable, so that the open sector 15 can be set at any desired position on the arc. The background against which the digits were read was a rectangular board 16 painted matte black.

Two sets of digits were test studied: the Naval Air Material Equipment Laboratory digits, which were used as a criterion because such set has been most systematically validated (in WADC Technical Report 54–262 of June 1954 by M. N. Crook and F. S. Baxter on The Design of Digits, especially at page 52), and the set of digits of the subject invention. Each digit in both sets was of the same height, 42 mm., subtending a visual angle of 28.6 minutes at a viewing distance of 16.5 feet.

As shown in FIG. 1, in the set of digits of the subject invention, the digit "one" has a physically dominant filled area 18, the digit "two" a crook 17 subtending a substantially triangular physically dominant filled area 19, and the "three" a pair of joined crooks 21 and 23. The "four" is double contoured and has cross-bar legs 25 and 27, the "five" has a physically dominant filled area 29 subtending a crook 31, and the "six" has a slanted leg arc 33 subtending a physically dominant filled ellipse-like area 35. The "seven" has a transverse bar 37 subtending, from one end, a slanted straight leg 39, and the "eight" has a pair of double contoured apex-joined sectors 41 and 43. The "nine" comprises a double contoured circle 45 subtending a vertically depending leg 47, and the "zero" comprises area 49. Said area 49 is the geometrical shape defined by that area which is common to intersecting circles having equal radii. Double contour of area 49 is provided by circle 50.

Each of the digits "one" to "zero," both inclusive, has salient angles A, tending to maximize digit legibility under the environment employed.

As shown in FIG. 2, overhead fluorescent tubes 51 enclosed in red acrylic cylinders 53 illuminated the digits, providing red light of the dominant wave length accepted as standard in submarine lighting. (The red conforms to specifications requiring negligible or no transmittance below 580 mm. and a minimum total transmittance of 2.5 percent for a source at 2355° K.) The brightness of the digits, when each was displayed at the open sector 15, was 0.165 fL (as measured by an Ultra-Sensitive Spectra Brightness Spot Meter).

The form threshold for the digits was obtained by means of the binocular Luckiesh-Moss visibility meter. The experimenter also used the uniocular Cottrell contrast-brightness threshold meter described by C. L. Cottrell in the article Measurement of Visibility, Illum. Eng., 1951, 46, 95–103.

In comparing the digit sets, each observer was adapted to the relatively low red illumination of the test environment for five minutes before being tested. During this period the observer was shown the dial 11 on which a given set of digits was exposed fully.

Under test, the observer 55 was shown one digit at a time in the inverted position, as in FIG. 2. No foreknowledge of the identity of a digit was permitted: before presentation of a digit, the observer shut down the Luckiesh-Moss meter until it was adjusted a considerable distance below the absolute threshold level of perceivability. The experimenter kept the digit covered with a hand screen during this interim. Upon signal, the hand screen was withdrawn and the operator slowly increased the brightness of the visual field until he arrived at the level where he could just barely, but with certainty, identify the digit. Where the operator inadvertently overran the absolute threshold—the minimum readable level—the meter value was not recorded. For a given set, digits were presented randomly.

Analysis of variance on the Luckiesh-Moss readings shows that there is a significant perceptual difference between the Naval Air Material Equipment Laboratory digits and the digits of the subject invention, each operator manifesting a significantly lower absolute threshold of readability on the latter, and each digit in the latter having a lower absolute threshold of readability than its twin digit in the former.

Under conditions of low brightness of red light, white figure is more effective operationally than is black figure. Great "energy" resides in a white figure: when black figure was used on a white ground at low red brightness levels, the white ground strongly tended to assume figural characteristics, with the result that the digit design was so altered phenomenally as to prevent speedy and easy recognition.

Under low red brightness, the "object" or "thing" character of a black figure on white ground is progressively weakened and can be destroyed finally by the great activity of the white ground. But white figure, with its great vector strength directed outward, endures long after a black figure has been annihilated by white ground.

The superiority of the subject number-set over number-sets of the prior art can be attributed, in some measure, to the provision of salient angles or corners, maximal double contouring of numbers, and the retention of physically dominant filled areas and classic crooks without radical departure from traditional design, whereby mnemonic problems stemming from novelty are minimized.

Obviously many modifications and variations of the present invention are possible in the light of the above teachings. It is therefore to be understood that within the scope of the appended claims the invention may be practiced otherwise than as specifically described.

I claim:
1. A font of numerals as shown in FIG. 1.
2. In an environment of low brightness of red light, a font of numerals as shown in FIG. 1.

References Cited in the file of this patent

UNITED STATES PATENTS

| | | |
|---|---|---|
| 1,145,447 | Todd et al. | July 6, 1915 |
| 1,615,566 | Brewer | Jan. 25, 1927 |
| 2,258,891 | Harrington | Oct. 14, 1941 |

OTHER REFERENCES

The Design of Digits, by Crook and Baxter, June 1954 (WADC Tech Report 54–262), copy in Naval Research Lib., Washington, D.C.